US006961393B1

(12) United States Patent
Cupo et al.

(10) Patent No.: US 6,961,393 B1
(45) Date of Patent: Nov. 1, 2005

(54) IN-BAND-ON-CHANNEL (IBOC) SYSTEM AND METHODS OF OPERATION USING ORTHOGONAL FREQUENCY DIVISION MULTIPLEXING (OFDM) WITH TIMING AND FREQUENCY OFFSET CORRECTION

(75) Inventors: Robert Louis Cupo, Eatontown, NJ (US); Muhammad R. Karim, Wayside, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/352,404

(22) Filed: Jul. 14, 1999

(51) Int. Cl.[7] .............................................. H03D 1/00
(52) U.S. Cl. ..................................... 375/343; 375/150
(58) Field of Search ............................... 375/316, 326, 375/330, 327, 343, 344, 136, 143, 142, 147, 375/150, 152; 370/206, 207, 208, 210, 281, 370/284, 480, 209, 282

(56) References Cited

U.S. PATENT DOCUMENTS

| | | | | |
|---|---|---|---|---|
| 5,764,706 A | * | 6/1998 | Carlin et al. ................. | 375/326 |
| 5,774,450 A | * | 6/1998 | Harada et al. ............... | 370/206 |
| 5,787,123 A | * | 7/1998 | Okada et al. ................ | 375/324 |
| 5,812,523 A | * | 9/1998 | Isaksson et al. ............. | 370/208 |
| 6,021,110 A | * | 2/2000 | McGibney .................... | 370/208 |
| 6,108,353 A | * | 8/2000 | Nakamura et al. ........... | 370/504 |
| 6,125,124 A | * | 9/2000 | Junell et al. ................. | 370/503 |
| 6,148,045 A | * | 11/2000 | Taura et al. .................. | 375/344 |
| 6,151,353 A | * | 11/2000 | Harrison et al. ............. | 375/136 |
| 6,151,369 A | * | 11/2000 | Ohkubo et al. .............. | 375/332 |
| 6,169,751 B1 | * | 1/2001 | Shirakata et al. ............ | 370/480 |
| 6,226,337 B1 | * | 5/2001 | Klank et al. ................. | 375/367 |
| 6,310,926 B1 | * | 10/2001 | Tore ............................ | 375/355 |
| 6,314,083 B1 | * | 11/2001 | Kishimoto et al. .......... | 370/210 |
| 6,314,113 B1 | * | 11/2001 | Guemas ....................... | 370/480 |
| 6,356,555 B1 | * | 3/2002 | Rakib et al. ................. | 370/441 |
| 6,381,236 B1 | * | 4/2002 | Miyashita et al. ........... | 370/343 |

* cited by examiner

*Primary Examiner*—Emmanuel Bayard

(57) ABSTRACT

An OFDM receiver recovers an rf signal as in-phase (I) and quadrature phase (Q) components of a baseband signal sampled in an A/D converter. The I and Q components of a received symbol are correlated at all sampling points. Correlation values are averaged over the latest L frames and saved in an L-deep FIFO. Symbol amplitude and phase are computed and passed to an offset estimator and an OFDM frame synchronization estimator. A phase-locked loop oscillator provides a sample number identifying the OFDM frame boundary to the offset estimator. An estimated offset value is selected as the negative of the phase angle of the auto correlation.

21 Claims, 6 Drawing Sheets

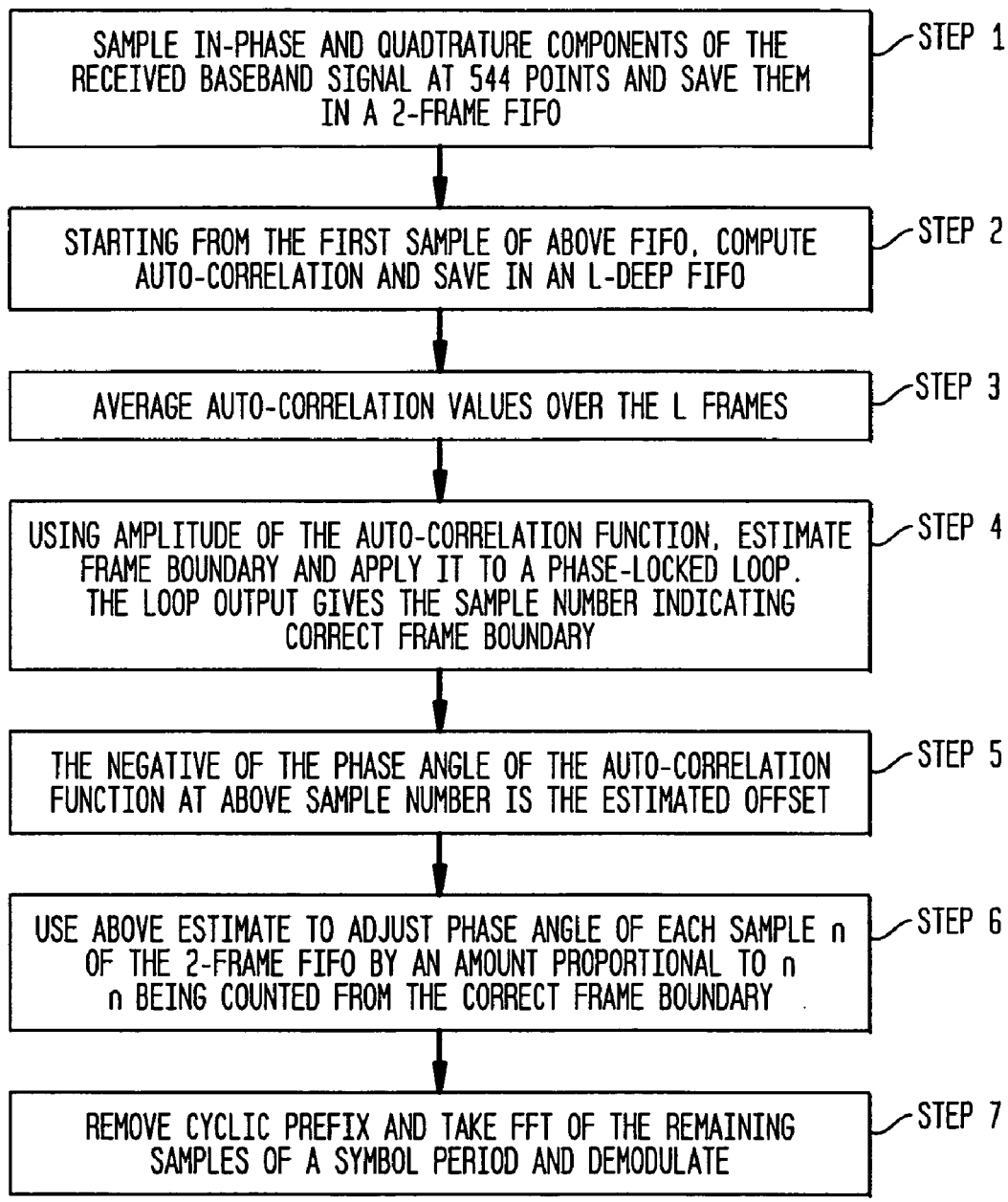

FIG. 4

| TEST CONDITIONS | NOISE | OFFSET | FADING | OFFSET CORRECTION | BIT ERROR RATE |
|---|---|---|---|---|---|
| 1 | NO | 0.30 | NO | NO | 0.1 |
| 2 | NO | 0.5 | NO | NO | 0.35 |
| 3 | 10 dB SNR | NO | NO | - | 0.000020 |
| 4 | " | 0.5 | NO | YES | 0.000020 |
| 5 | " | NO | Urban slow | - | 0.01673 |
| 6 | " | NO | Urban Fast | - | 0.01325 |
| 7 | " | NO | Rural | - | 0.04763 |
| 8 | " | 0.30 | Urban slow | NO | 0.15000 |
| 9 | " | 0.30 | Urban slow | YES | 0.01500 |
| 10 | " | 0.30 | Urban Fast | YES | 0.01022 |
| 11 | " | 0.30 | Rural | YES | 0.03727 |

…

IN-BAND-ON-CHANNEL (IBOC) SYSTEM AND METHODS OF OPERATION USING ORTHOGONAL FREQUENCY DIVISION MULTIPLEXING (OFDM) WITH TIMING AND FREQUENCY OFFSET CORRECTION

BACKGROUND OF THE INVENTION

1. Field of the Invention

This invention relates to communication systems. More particularly, the invention relates to IBOC systems using OFDM with timing and frequency offset correction.

2. Description of Prior Art

IBOC systems enable digital signals to fit within the bandwidth or frequency allocation of existing AM and FM stations. IBOC systems preserve frequency spectrum by using existing allocations efficiently to deliver digital sound without disrupting AM and FM broadcasting. IBOC systems are subject to multipaths for the interference of signals, delayed upon themselves, due to reflections from man-made structures, such as buildings or from natural features, such as hills and trees. One method of minimizing the effect of multipaths is the use of Orthogonal Frequency Division Multiplexing (OFDM) technique. OFDM is a form of multi-carrier modulation where carrier spacing is carefully selected so that each sub-carrier is orthogonal to the other sub-carriers. In OFDM, the total signal frequency band is divided into N non-overlapping frequency sub-channels. Each sub-channel is modulated with a separate symbol and, then, the N sub-channels are frequency-division multiplexed. There are three schemes used to separate the modulated sub-carriers: (1) The use of filters to completely separate sub-bands; (2) the use of staggered quadrature amplitude modulation (QAM) to increase the efficiency of band usage; and (3) the use of discrete Fourier Transforms to modulate and demodulate parallel data. The orthogonality of the sub-channels can be maintained and individual sub-channels can be completely separated by Fast Fourier Transforms (FFT) at the receiver when there are no Intersymbol Interference (ISI) and Intercarrier Interference (ICI) introduced by transmission channel distortion. One way to prevent ISI is to create cyclically extended guard intervals where each OFDM symbol is preceded by a periodic extension of the signal itself. When the guard interval is longer than the channel impulse response, or the multipath delay, the ISI can be eliminated. Using cyclic prefix at the transmitter, one can determine OFDM frame boundaries. If there is a difference in the clock frequencies at the transmitter and receiver, there are two problems. First, the difference causes an uncertainty in the frame synchronization. Second, even if no error occurred in frame synchronization, there would still be significant errors at a data demodulator. What is needed in the art is a system to recover timing and data in an IBOC system subject to timing and frequency offsets.

Prior art related to OFDM includes the following:

U.S. Pat. No. 5,732,113 entitled "Timing and Frequency Synchronization of OFDM Signals" to T. M. Schmidl et al., issued Mar. 24, 1998 (Schmidl), discloses timing, carrier frequency, and sampling rate synchronization of a receiver to an OFDM signal using two OFDM training signals. A first OFDM training signal has only even numbered sub-carriers, and substantially no odd numbered sub-carriers, an arrangement that results in half-symbol symmetry. A second OFDM training symbol has even numbered sub-carriers differentially modulated relative to those of the first OFDM training signal by a predetermined sequence. Synchronization is achieved by computing metrics, which utilize the unique properties of these two OFDM training signals.

U.S. Pat. No. 4,604,583 entitled "Frequency Offset Correcting Circuit" to H. Aoyagi et al., issued Aug. 5, 1986 (Aoyagi), discloses a frequency offset correction circuit in a demodulator which receives parallel channel signals and recovers each baseband signal of the parallel channel. The frequency offset correction circuit includes a second order phase-locked loop following a demodulating circuit arranged to detect baseband signals of incoming parallel channel signals. The second order phase-locked loop include first and second control loops. The first control loop corrects a static phase shift of the pilot channel while the second control loop functions to correct abrupt frequency offset. The second order phase-locked loop is further utilized to correct both static phase shift and abrupt frequency offset data channels. A third control loop compensates for static or slowly changing frequency offsets of the channels.

U.S. Pat. No. 5,444,697 entitled "Method and Apparatus For Frame Synchronization in Mobile OFDM Data Communications" to C. Leung et al. (Leung), discloses a method and apparatus for achieving symbol (frame) synchronization of digital data in an OFDM channel. A three-stage synchronization process is disclosed. First, an onset of an OFDM frame is detected. Second, coarse synchronization is achieved by sampling the received signal, and measuring the correlation between the received signal and a reference signal. Third, synchronization is achieved by calculating the time shift between the coarse synchronization point and the actual synchronization point and using the calculated time shift to determine the phase correction to apply to each data-carrying sub-carrier. The transmitted data is recovered by decoding the information obtained about the phase and amplitude of the data-carrying sub-carriers.

U.S. Pat. No. 5,771,224 entitled "An Orthogonal Frequency Division Multiplexing Transmission System and Transmitter and Receiver Therefor" to T. Seki et al. (Seki), issued Jun. 23, 1998, discloses transmitting an OFDM frame with null symbols and reference signals placed at the beginning portion of the frame, and QPSK symbols placed in an information symbol data region in the frame with equal spacing in time and frequency. At a receiving end, an error detector detects amplitudes and phase errors of each carrier from the reference symbols and a variation detector detects the variations in the amplitude and phase of a received signal from the QPSK signals. The carrier amplitude and phase errors are corrected by a correction information producing section on the amplitude and phase variations of the received signals detected by the variation detector to produce correction information. An equalizing section equalizes the demodulated symbol data according to the correction information.

None of the prior art discloses correcting timing and frequency offset in OFDM systems working in the time domain after achieving frame synchronization by using an auto correlation function whereby nearly perfect cancellation of noise and multipath fading is achieved over a range of offset values.

SUMMARY OF THE INVENTION

An object of the invention is an improved IBOC system and method using OFDM having timing and data recovery in the presence of timing and frequency offset.

Another object is an improved IBOC system and method of operation providing frame synchronization and timing and data recovery in the presence of timing and frequency offset.

Another object is an improved IBOC system and method of operation that provides a clock that is phase coherent with the transmitter for use at different points in a receiver.

These and other objects, features and advantages are achieved in an improved FM In-Band-On-Channel (IBOC) system using Orthogonal Frequency Division Multiplexing (OFDM) having timing and data recovery for correction of timing and frequency offset between transmitters and receivers. Offset causes OFDM frame synchronization and data demodulation errors. In the system, an OFDM receiver recovers an rf signal as in-phase (I) and quadrature phase (Q) components of a baseband signal. The components are sampled at a selected number of points, e.g. 544 in an analog/digital converter. The output of the converter is stored in a two-deep FIFO. The I and Q components of a received symbol are correlated at all 544 sampling points. The correlation values are averaged over the latest L frames and saved in an L-deep FIFO. The amplitude and phase of the symbols are computed and passed to an offset estimator and an OFDM frame synchronization estimator. The amplitude is used to estimate the frame boundary in the frame synchronization estimator which provides a frame pointer to a phase-locked loop oscillator designed to achieve fast OFDM frame synchronization. The phase-locked loop oscillator provides a sample number indicating the OFDM frame boundary to the offset estimator. An estimated offset value is selected as the negative of the phase angle of the auto correlation function at the above sample number. The offset value is applied to the frame stored in the two-deep FIFO and identified by the sample number for correcting the time domain samples of the useful symbol period, after which the corrected samples are applied to the input of an FFT block and thence to a data demodulator. A programmable counter coupled to the phase locked loop locks the receiver clock to the transmitter clock.

DESCRIPTION OF DRAWING

The invention will be further understood from the following detailed description of a preferred embodiment taken in conjunction with an appended drawing, in which:

FIG. 1(*b*) depicts the time domain of FIG. 1(*a*) with the added guard-period containing a cyclic prefix.

FIG. 2(*b*) is a representation of a phase-locked loop in FIG. 2(*a*).

FIG. 3 is a flow diagram of an algorithm implemented in FIG. 2(*a*0 for timing and data recovery for a hybrid FM IBOC system in the presence of timing and frequency offset.

FIG. 4 is a table describing the performance of FIG. 2(*a*) in terms of bit error rate under various conditions.

DETAILED DESCRIPTION OF PREFERRED EMBODIMENT

Figure 1A:
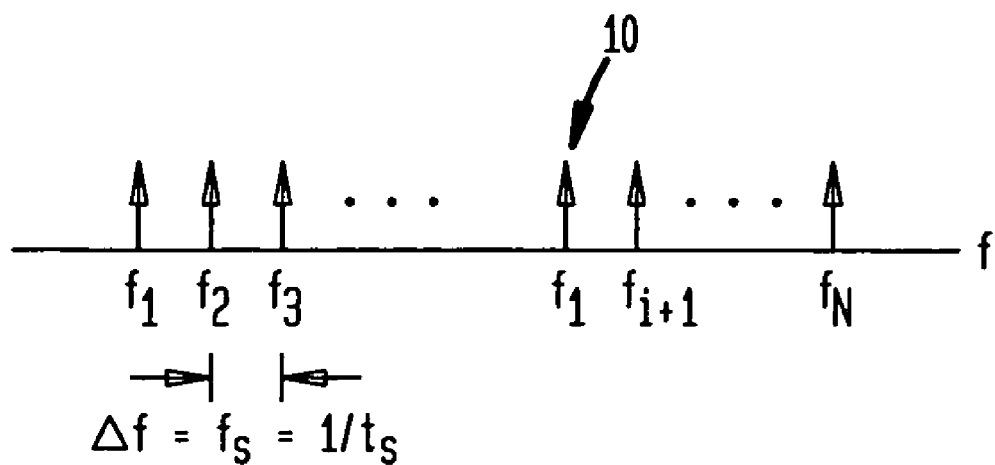
FIG. 1(*a*) depicts a frequency representation of OFDM sub-carrier signals using guard intervals.
Figure 1B:
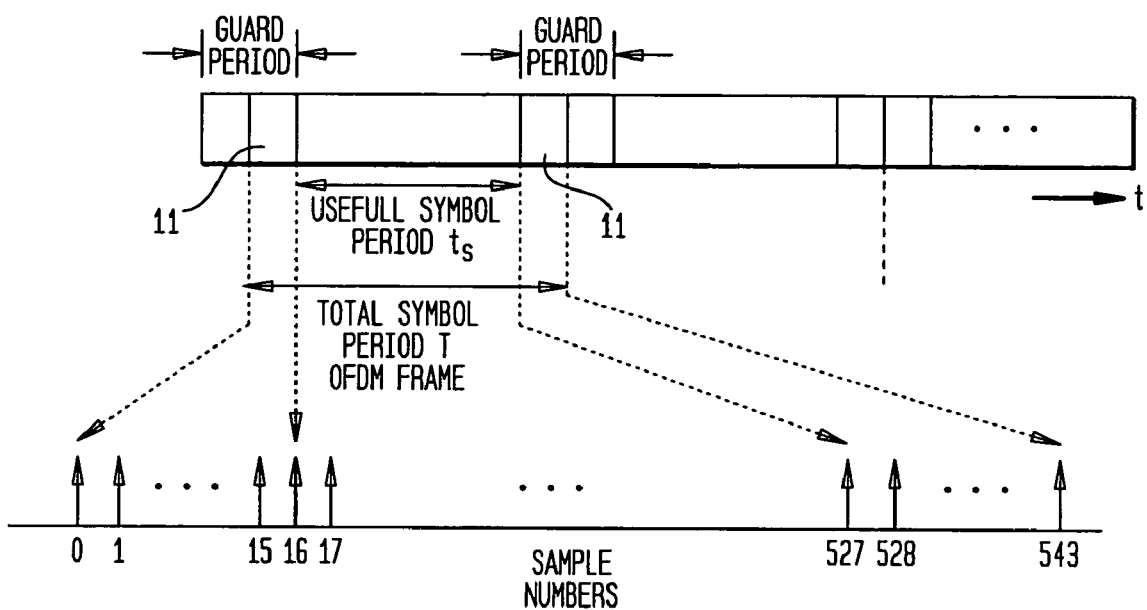

In FIG. 1(*a*), multi-carriers 10 are modulated such that carrier spacing is carefully selected whereby each sub-carrier is orthogonal to other sub-carriers. In OFDM, the entire available bandwidth B is divided into a number of points $K=f_1, \ldots, f_K$, where adjacent points are separated by a frequency band $f_s=\Delta f$, such that $B=K\Delta f$. In FIG. 1(*b*), 543 K points are grouped into a frame 1 or frame 2 of $K_1$ points and two tail slots of $K_2$ points each, such that $K=K_1+2K_2$ and $t_s$, is the useful symbol period. The frame carries the information intended for transmission under the form of Differential Phase-Shift Keying (DPSK) symbols or Quadrature Amplitude Modulated (QAM) symbols. Thus, each point in the frame corresponds to one information symbol. The two tail slots act as guard bands 11. The total symbol duration is $T=T_G+t_s$ where $T_G$ is the guard interval and $t_s$ is the useful symbol duration. The ratio of the guard interval to the useful symbol duration is application dependent. The insertion of guard interval, $T_G$, which is usually less than T/4 will reduce data throughput. Although not shown in the Figure, the symbols are overlapped in the frequency domain but are separated by the guard interval in the time domain. A digital communication system using OFDM is described in U.S. Pat. No. 5,841,813 issued Nov. 24, 1998, assigned to the assignee of the present invention and fully incorporated herein by reference.

Figure 2A:
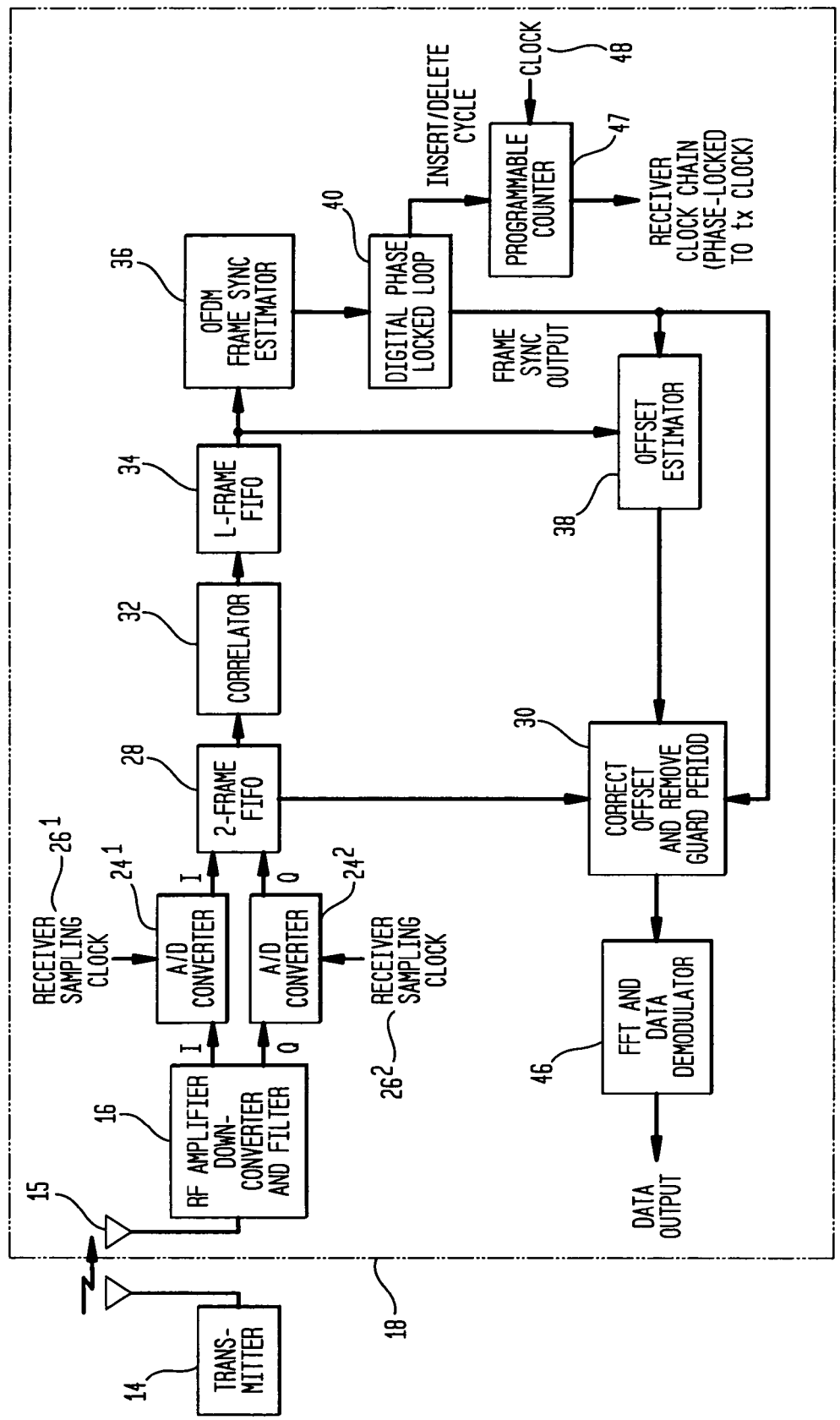
FIG. 2(*a*) is a block diagram of a receiver in an IBOC system using OFDM and incorporating the principles of the present invention.
Figure 2B:
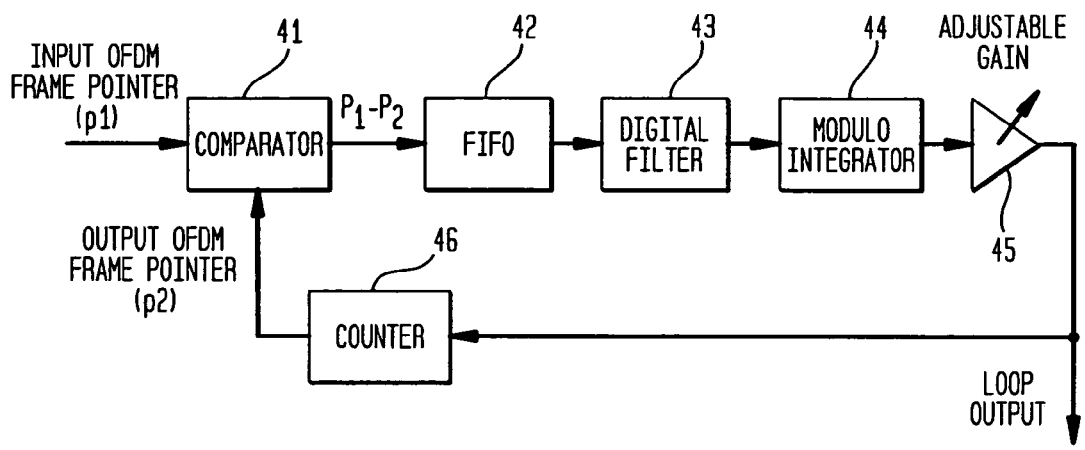

Turning to FIG. 2(*a*), an IBOC system 12, as generally described in U.S. Pat. Nos. 5,757,854 and 5,850,415, includes a transmitter 14 coupled through an antenna 15 and an RF amplifier—down converter—filter 16 in a receiver 18 using OFDM as previously described in connection with FIGS. 1(*a*) and (*b*). The transmitter uses cyclic prefix or guard rings which determine OFDM frame boundaries for frame synchronization. Both the transmitter 14 and the receiver 18 include a clock (not shown). When there is a difference in the clock frequencies at the transmitter and receiver, there are two problems. First the difference causes an uncertainty in frame synchronization. Second, there may be frequency offset between the local oscillator and the transmitter and the local oscillator and the receiver which causes sampling errors of the same amount in the frequency domain. The result is an increased Bit Error Rate (BER) with significant data errors at the receiver. A feature of the invention is an IBOC system which corrects the problems of frame synchronization and frequency offset. An OFDM system, unlike well-known binary FM systems, does not explicitly provide bit timing information and, as such, does not lend itself to conventional clock derivation techniques. However, the present invention provides a way to derive a clock that is phase coherent with the transmitter which can be used at different points in the receiver.

A RF modulated signal 17 is received at the receiver 18 and processed in accordance with OFDM. The signal 17 is recovered as an In Phase component (I) and a Quadrature Phase component (Q) of a baseband signal (not shown) by the unit 16. The I and Q outputs are each provided to standard analog-to-digital converters $24^1$ and $24^2$, respectively responsive to receiver sampling clocks $26^1$ and $26^2$, respectively. The (I) and (Q) components of the received signal are each sampled in the converters at 544 points using the receiver sampling clocks. The output of the converter 24 is provided to a standard 2-frame FIFO 28 which then feeds into an offset correcting circuit 30 and a correlator 32. Starting from the first sample in the FIFO 28, a complex auto-correlation function $R_i$, of the I and Q components of the received symbol is computed for $i=0,1,\ldots,543$ in the following way. Let $Z_k$ be the received k-th sample $$z_k = x_{I,k} + jx_{Q,k}$$

where $x_{I,k}$ and $x_{Q,k}$ are, respectively, the I and Q components of the received sample. Then $$R_i = \sum_{L=1}^{i+31} z_k z_k^+ + 512$$

where $z_k^+$ is the complex conjugate of $z_k$. Values of $R_i$ for L latest frames are saved in the L-frame FIFO. Suppose $R_i(j)$ is the value of the auto-correlation function $R_i$ of the j-th fine of that FIFO. Its average value $\overline{R}_i$ is then computed as $$\overline{R}_i = \sum_{j=1}^{L} R_i(j).$$

The amplitude and phase components of $\overline{R}_i$, i=0,1, ..., 543 are provided to an OFDM frame synchronization estimator 36 and an offset estimator 38. The frame synchronization estimator 36 uses the amplitude of the auto-correlation function to estimate the frame boundary. The index at which the amplitude of $\overline{R}_i$ is maximum for all i with i=0, 1, ..., 543 gives the estimated frame boundary. For each incoming frame, this index which is actually a pointer to a specific sample of that frame is provided to a digital phase-locked loop 40 which generates a sample number indicating the desired OFDM frame boundary.

As shown in FIG. 2(*b*), the phase-locked loop works in the following manner. Suppose that at any instant $p_1$ and $p_2$ are, respectively, the estimated frame boundary that is applied to the input of the phase-locked loop and the desired frame boundary at the output of the loop. Depending on the difference between the instantaneous values of $p_1$ and $p_2$, the loop gain is dynamically adjusted in each symbol period. The difference $p_1-p_2$ is obtained in summing circuit 41 and saved in a FIFO 42. The saved differences are averaged over eight latest frames and passed through a first-order lead-lag filter 43, integrated in a modulo integrator 44, rounded off to the nearest integer value, and amplified in amplifier 45. The amplifier provides an input to a counter 46 which provides the sample number for the desired frame boundary $p_2$. Returning to FIG. 2A, the amplifier also provides to an external programmable counter 47 an output signal $p_{2,\ locked}$ transmitter signal $p_1$ in the phase locked loop. The counter 47 is responsive to a clock 48 and provides a receiver clock chain output phase locked to the clock of the transmitter.

The above frame boundary $p_2$ is provided to the offset estimator 38 and the offset correction circuit 30. In the offset estimator 38, the offset is estimated as the negative of the phase angle of the auto correlation function $R_i$ for i=$p_2$. Let $\phi$ be this estimated offset. Values of $\phi$ and $p_2$ are provided to the offset correcting circuit 30 which modifies the amplitude and phase of each sample stored in the FIFO 28 to correct for frequency synchronization, frame synchronization, and transmitter/receiver frequency offset in the following manner. Let $\theta_k = 2\pi\phi k/544, 0 \leq k \leq 543$.

Then the corrected symbol is given by $\hat{z}_k = x_{I,k} \cos\theta_k - x_{Q,k} \sin\theta_k + j[x_{I,k} \sin\theta_k + x_{Q,k} \cos\theta_k]$.

The output of the correction circuit 30 is provided to an FFT block and a data demodulator 46 which provides data recovery for the IBOC system in the presence of timing and frequency offset between the transmitter and the receiver 18.

In FIG. 3, an algorithm 50 is implemented in the receiver 18 to correct for timing and frequency offset in the OFDM baseband signal, as follows:

In step 1, the OFDM baseband signal is received and filtered. Analog/digital conversion is performed and the in-phase (I) and quadrature phase (Q) components of the received baseband signal are sampled at a selected number of points and saved in a two-frame FIFO for processing by a correlator.

In step 2, in the correlator, starting from the first sample, the auto correlation values of the I and Q components are computed.

In step 3, the auto correlation values are stored in an L-word FIFO wherein the values are averaged over the L symbols to calculate the amplitude and phase for the frame.

In step 4, the amplitude of the auto correlation function is used to estimate the frame boundary which is applied to a phase locked loop oscillator. The output of the oscillator gives the sample number indicating the correct frame boundary.

In step 5, an offset estimator uses the negative of the phase angle of the auto correlation function at the sample number as the estimated offset.

In step 6, an offset correction circuit uses estimated offset in step 6 to adjust the phase angle of each sample n of the two-frame FIFO by an amount proportional to n, n being counted from the correct frame boundary provided by the phase locked loop oscillator.

In step 7, the guard interval or cyclic prefix is removed and the remaining samples of a symbol period are subjected to a Fast Fourier Transform (FFT) and demodulated.

In FIG. 4, the Bit Error Rate (BER) for the receiver is shown in a table for various test conditions 1–11 of noise and fading. At test conditions 1 and 2, without noise or fading, but in the presence of the frequency offset which is left uncorrected at the receiver, the bit error rate is 0.1 and 0.35 for an offset of 0.3 and 0.5, respectively, where the offset is expressed as a fraction of the frequency of separation between adjacent sub-carriers. In this case, the BER is so high that the data is virtually unusable. At test condition 3, for a 10B Signal to Noise Ratio without offset or fading, the BER is very small as predicted theoretically. At test condition 4, both noise and a frequency offset of 0.5 have been added to the transmitted signal, but at the receiver, the offset has been corrected. In this case, the resulting BER reduces to the same level as for the case without any offset (i.e. test condition 3). In other words, the offset seems to have been corrected perfectly.

Test conditions 5–7 show that if there are various degrees of fading but no frequency offset, the BER performance worsens significantly compared to test condition 3, but not as much as with offset as indicated in test conditions 1 and 2. In this case, a BER of 3% is not unusual. With fast fading, e.g., a rural model with a mobile velocity of 150 km. per hour with a Doppler shift of about 13 Hz, the BER is worse than for slow fading, e.g., with an urban slow model with a mobile velocity of 10 km. per hour with a Doppler shift of about 0.87 Hz.

Comparing test conditions 8 and 1, fading further adds to the BER so that if the frequency offset is not corrected, the received data is not usable.

Comparison of test conditions 9 and 8 shows that with the offset correction, the BER improves by an order of magnitude. Similarly, comparing conditions 9–11 with conditions 5–7, it can be seen that when offset is corrected, the BER in the presence of fading becomes lower than that for the simple case of fading without added offset, again indicating that the offset has been cancelled perfectly. The improvement in performance with offset correction becomes more significant at higher mobile velocities.

While the invention has been shown and described in a preferred embodiment, various changes may be made therein without departing from the spirit and scope of the invention as defined in the appended claims in which:

What is claimed is:

1. An OFDM receiver, comprising:
    means for recovering and sampling an RF signal from a transmitter into in-phase (I) and quadrature phase (Q) components of a baseband signal;
    means for computing auto correlation amplitude and phase values of the I and Q components at sample points in the baseband signal;
    means for averaging and saving the auto correlation values of the I and Q components of the baseband signal over L symbols for two or more frames before computing the correlation;
    phase lock loop means for providing a sample number indicating an OFDM frame boundary using the averaged I and Q auto correlation values based on $$\overline{R}_i = \sum_{j=1}^{L} R_i(j).$$

where: $R_i$ is the average auto correlation value; L is the latest frame; $R_i(j)$ is the auto correlation value of the j-th frame and an output signal locked to the transmitter RF signal;
    means providing a receiver clock chain output phase locked to the transmitter RF signal;
    means providing an offset value indicative of the phase difference between the receiver and a transmitter; and
    means for correcting frequency and timing offset between the receiver and the transmitter in the sample number.

2. The OFDM receiver of claim 1 further comprising:
    means for estimating frame synchronization of the OFDM frame boundary.

3. The OFDM receiver of claim 1 further comprising:
    means for phase locking the transmitter and the receiver.

4. The OFDM receiver of claim 1 further comprising:
    means for estimating the transmitter and receiver frame offset.

5. The OFDM receiver of claim 1 further comprising:
    means responsive to the sample number and a negative phase angle of the auto correlation values for correcting for frequency synchronization, frame synchronization, and transmitter/receiver frequency offset.

6. The ODFM receiver of claim 1 further comprising:
    means responsive to a sampling clock for generating the I and Q of the received signal.

7. The OFDM receiver of claim 1 further comprising:
    means for storing the sampled I and Q components coupled to the auto correlation means and a correcting means.

8. The OFDM receiver of claim 1 further comprising:
    means for storing the averaged auto correlation values coupled to an offset estimator and a frame synchronization estimator.

9. A method of correcting timing and frequency offset in an OFDM receiver, comprising the steps of:
    sampling in-phase (I) and quadrature phase (Q) components of a baseband signal;
    computing auto-correlation amplitude and phase values of the I and Q components based on $$\overline{R}_i = \sum_{j=1}^{L} R_i(j).$$

where: $R_i$ is the average auto correlation value; L is the latest frame; $R_i(j)$ is the auto correlation value of the j-th frame;
    estimating a frame boundary of the received signal;
    providing a sample number indicating a correct frame boundary;
    estimating frequency and timing offset in the sample number of the receiver and a transmitter; and
    correcting the frequency and timing offset in the sample number.

10. The method of claim 9 further comprising the step of:
    using the amplitude of the auto-correlation function to estimate the frame boundary.

11. The method of claim 9 further comprising the step of:
    using the negative of the phase angle of the auto-correlation value as an estimated frequency offset at the sample number.

12. The method of claim 9 further comprising the step of:
    applying the estimated frame boundary to a phase-locked loop.

13. The method of claim 9 further comprising the step of:
    generating a coherent phase clock signal for the transmitter and the receiver.

14. The method of claim 9 further comprising the steps of:
    storing the I and Q component values;
    providing the stored I and Q values for auto-correlation; and
    providing the stored values for offset correction.

15. The method of claim 9 further comprising the steps of:
    storing the auto correlation values;
    providing the auto-correlation values to a frame estimator;
    providing the auto-correlation values to an offset estimator.

16. The method of claim 9 further comprising the steps of:
    adjusting the phase angle of each sample in a storing means by an amount proportional to "n" where "n" is counted from a correct frame boundary.

17. The method of claim 9 comprising the step of:
    averaging the auto-correlation values over frames in a storage device.

18. an IBOC system including a filter coupled to a converter, a first storage means coupled to the converter and to a correlator, a second storage means coupled to a frame synchronization estimator and an offset estimator, a phase locked loop coupled to the frame synchronization estimator and to the offset estimator, and an offset correction means coupled to the first storage means, the offset estimator and the phase locked loop, a method of correcting timing and frequency offset between a transmitter and a receiver in the system, comprising the steps of:
    sampling in-phase (I) and quadrature phase (Q) components of a received baseband signal;
    computing auto-correlation amplitude and phase values of the I and Q components for two or more frames based on $$\overline{R}_i = \sum_{j=1}^{L} R_i(j).$$

where: $R_i$ is the average auto correlation value; L is the latest frame; $R_i(j)$ is the auto correlation value of the j-th frame;
estimating a frame boundary of the received signal;
providing a sample number indicating a correct frame boundary using a phase lock loop; providing a receiver clock chain output phase locked to a transmitter;
estimating the transmitter and receiver frequency and timing offset in the sample number; and
correcting the frequency and timing offset in the sample number.

19. An OFDM receiver, comprising:
means for recovering and sampling an RF signal into in-phase (I) and quadrature phase (Q) components of a baseband signal;
means for computing auto correlation amplitude and phase values of the I and Q components at sample points based on $$\overline{R}_i = \sum_{j=1}^{L} R_i(j).$$

where: $R_i$ is the average auto correlation value; L is the latest frame; $R_i(j)$ is the auto correlation value of the j-th frame;
means for averaging the auto correlation values of the I and Q components over L symbols;
phase lock loop means for providing a sample number indicating an OFDM frame boundary using the averaged I and Q auto correlation values, the phase locked loop comprising:
means responsive to a first and a second frame synchronization signal for providing a difference signal indicative of the frame difference between a transmitter and the receiver;
means for averaging differences over a series of frames as a frame difference output;
means for processing the frame difference output through a filter;
means responsive to the filter for integrating and rounding off the frame difference output to the nearest integer value;
counter means responsive to the integer value providing a sample number for a desired frame boundary;
means providing an offset value indicative of the phase difference between the receiver and a transmitter; and
means for correcting frequency and timing offset between the receiver and the transmitter in the sample number.

20. An OFDM receiver, comprising:
means for recovering and sampling an RF signal into in-phase (I) and quadrature phase (Q) components of a baseband signal;
means for computing auto correlation amplitude and phase values of the I and Q components at sample points;
means for averaging the auto correlation values of the I and Q components over L symbols;
phase lock loop means for providing a sample number indicating an OFDM frame boundary using the averaged I and Q auto correlation values, the phase locked loop comprising:
means responsive to a first and a second frame synchronization signal for providing a difference signal indicative of the frame difference between the transmitter and receiver;
means for averaging differences over a series of frames as a frame difference output;
means for processing the frame difference output through a filter;
means responsive to the filter for integrating and rounding off the frame difference output to the nearest integer value;
amplifier means responsive to the means for integrating and rounding off providing a coherent clock signal for the transmitter and the receiver;
counter means responsive to the integer value providing a sample number for a desired frame boundary;
means providing an offset value indicative of the phase difference between the receiver and a transmitter; and
means for correcting frequency and timing offset between the receiver and the transmitter in the sample number.

21. The OFDM receiver of claim 20 further comprising;
a programmable counter responsive to a coherent clock signal and a receiver clock for generating a receiver clock chain phase locked to a clock in the transmitter.

* * * * *